United States Patent
Buck et al.

(10) Patent No.: US 10,253,616 B2
(45) Date of Patent: Apr. 9, 2019

(54) CARRIER MECHANISM AND INSTALLATION METHOD FOR DOWNHOLE GAUGE

(71) Applicant: SERCEL-GRC CORP, Tulsa, OK (US)

(72) Inventors: Adam Vincent Buck, Tulsa, OK (US); Bradley Chandler Holliday, Claremore, OK (US); Nicholas Frederick Budler, Claremore, OK (US)

(73) Assignee: SERCEL-GRC CORP., Tulsa, OK (US)

( * ) Notice: Subject to any disclaimer, the term of this patent is extended or adjusted under 35 U.S.C. 154(b) by 448 days.

(21) Appl. No.: 14/967,881

(22) Filed: Dec. 14, 2015

(65) Prior Publication Data
US 2016/0177702 A1    Jun. 23, 2016

Related U.S. Application Data

(60) Provisional application No. 62/093,076, filed on Dec. 17, 2014.

(51) Int. Cl.
*E21B 47/01* (2012.01)
*G01V 11/00* (2006.01)

(52) U.S. Cl.
CPC .......... *E21B 47/011* (2013.01); *G01V 11/002* (2013.01)

(58) Field of Classification Search
CPC .............................. E21B 47/011; E21B 47/01
See application file for complete search history.

(56) References Cited

U.S. PATENT DOCUMENTS

| | | | |
|---|---|---|---|
| 3,018,807 A * | 1/1962 | Clinefelter | B29C 47/686 425/191 |
| 4,593,771 A | 6/1986 | Comeau | |
| 4,628,995 A | 12/1986 | Young et al. | |
| 5,320,169 A | 6/1994 | Delatorre | |
| 5,327,971 A | 7/1994 | Garbutt et al. | |
| 6,125,935 A * | 10/2000 | Shahin, Jr. | E21B 33/14 166/250.14 |
| 6,523,609 B1 | 2/2003 | Miszewski | |
| 6,655,452 B2 | 12/2003 | Zillinger | |
| 7,090,010 B1 | 8/2006 | Martin | |
| 2015/0107379 A1 * | 4/2015 | Rose | G01F 15/18 73/866.5 |

FOREIGN PATENT DOCUMENTS

CA    1 201 057    2/1986

* cited by examiner

*Primary Examiner* — Paul M. West
(74) *Attorney, Agent, or Firm* — Patent Portfolio Builders PLLC (57) ABSTRACT

A tube for use inside a well. The tube includes a longitudinal body having two threaded ends, the body having a bore; a carrier mechanism located on an exterior of the body, wherein the carrier mechanism has a port and a protecting cover separated from each other by a pre-determined distance (D); and a nut configured to be screwed into the protecting cover.

22 Claims, 9 Drawing Sheets

CARRIER MECHANISM AND INSTALLATION METHOD FOR DOWNHOLE GAUGE

BACKGROUND

Technical Field

Embodiments of the subject matter disclosed herein generally relate to a downhole gauge that is attached to a carrier mechanism and a method for fixing the downhole gauge to a tubing or casing string.

Discussion of the Background

A downhole gauge may be a device used to collect data (e.g., pressure, temperature, etc.) in downhole environments, such as, for example, inside of wells used for oil and gas extraction. Downhole gauges may contain one or more sensors, for example, a pressure sensor, a temperature measuring device, etc. A downhole gauge that has been lowered into a well may be fixed to the casing or tubing of the well. Several gauges may be connected together, top to bottom, along with other survey equipment, along the casing or tubing.

Figure 1:
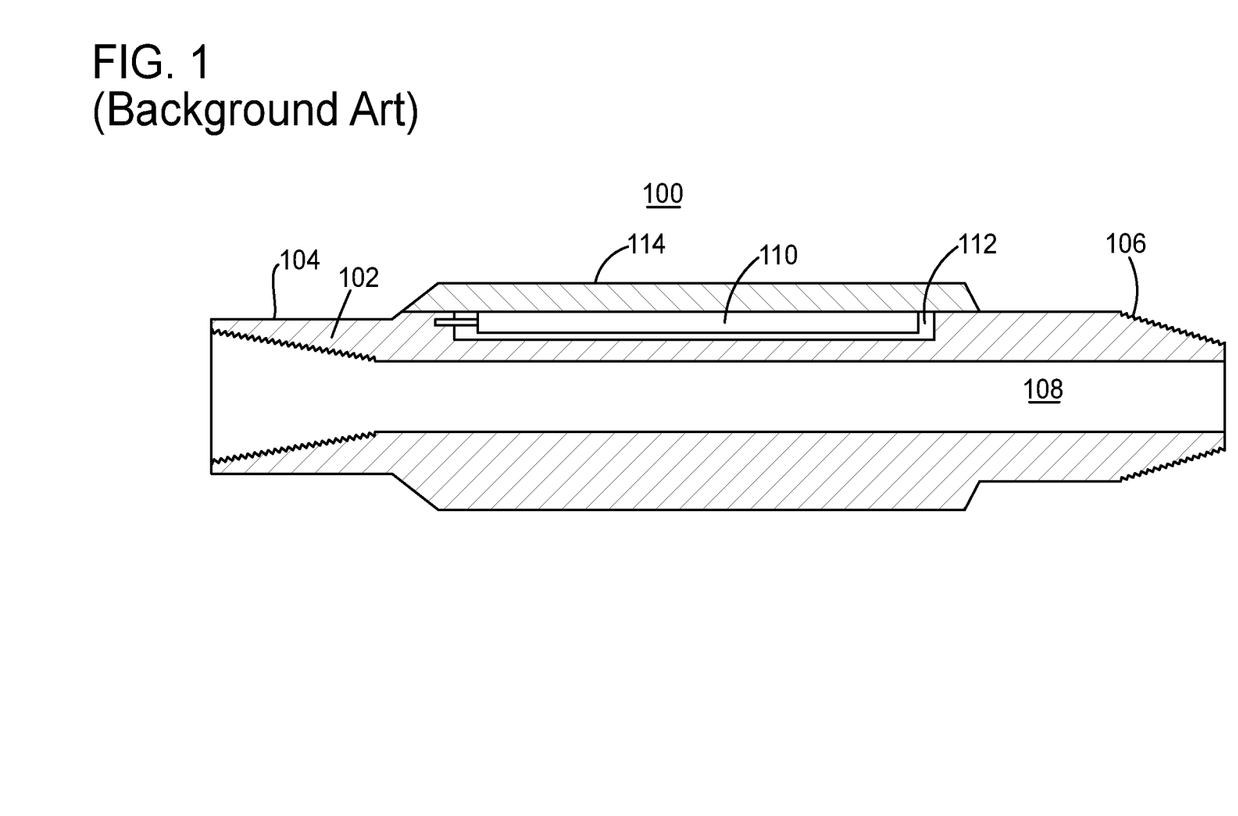
FIGS. 1 and 2 depict internally mounted gauges.

FIG. 1 depicts an exemplary casing 100 that has a downhole gauge 110 attached to it. Casing 100 has a cylindrical shape with its ends 104 and 106 threaded to connect to other casings. Casing 100 has a body 102 in which a bore 108 is formed through which oil and/or gas are flowing when deployed in the well.

During various stages of drilling, production and/or maintenance, various parameters around or inside the casings need to be known, as for example, the ambient pressure and/or temperature where the casing is located. In this regard, it is known that both the pressure and temperature are very high at the depths at which the casings are placed. A gauge 110 is then attached to the casing in one of two ways.

FIG. 1 shows gauge 110 being completely embedded in a chamber 112 formed in the body 102 of casing 100, as disclosed in U.S. Pat. No. 6,655,452. Various mechanisms may be used for fixing gauge 110 to body 102, e.g., a plate 114 being screwed to body 102 over gauge 110. This configuration requires that a recess is cut into the casing.

Figure 2:
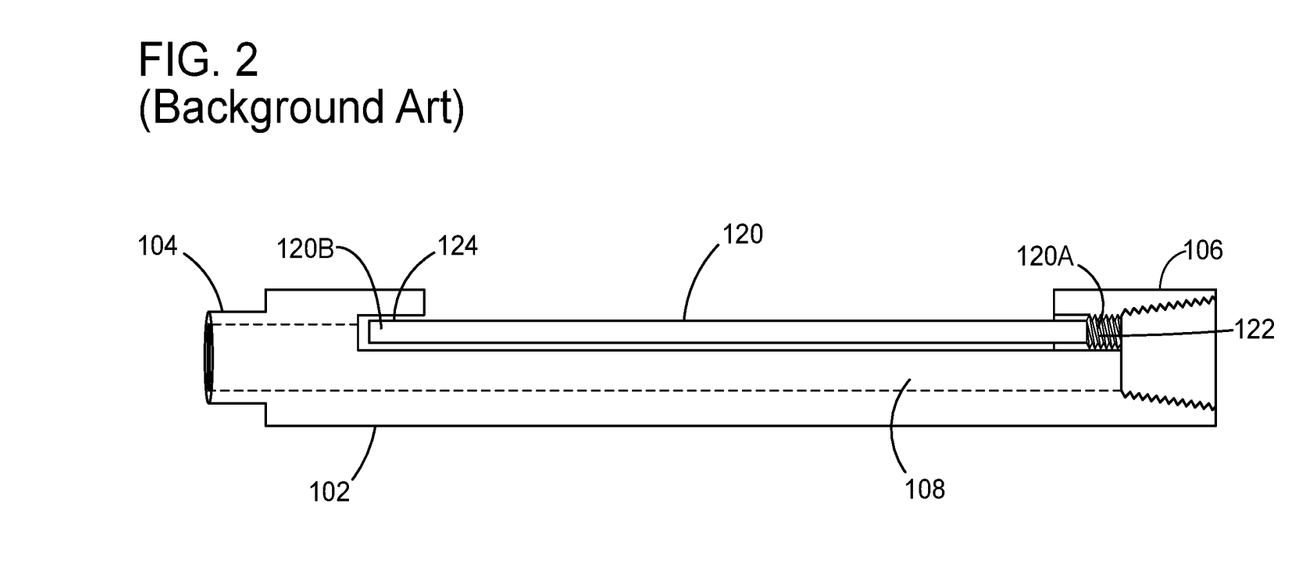

An alternative is to mount a gauge 120 inside body 102 as illustrated in FIG. 2, and disclosed in U.S. Pat. No. 7,090,010. In this case, a hole with a threaded region 122 is formed at end 106 of body 102 so that one end 120A of gauge 120 screws into it while the other end 120B of gauge 120 is hanging freely inside chamber 124. This configuration exhibits at least two disadvantages. One is that the gauge is disposed inside the tubing and, thus, the flow area inside bore 108 is reduced. The other one is that no electrical line can be attached to the gauge.

In addition, both configurations illustrated in FIGS. 1 and 2 have shown that an electrical connection that sometimes needs to be made between the gauge and a corresponding electrical line (usually called tubing encased cable, TEC) is cumbersome, if possible, due to the lack of clearance between the gauge and the casing. Further, these systems do not have a high pressure rating because of the gauge location or the lack of good seals between the gauge and the bore.

Thus, there is a need to provide a new gauge carrier mechanism that overcomes the above noted problems, makes the installation of the gauge simple, and/or prevents excessive vibrations of the gauge.

SUMMARY

In one embodiment, there is a down-hole tube for use inside a well. The tube includes a longitudinal body having two threaded ends, the body having a bore, a carrier mechanism located on an exterior of the body, wherein the carrier mechanism has a port and a protecting cover separated from each other by a pre-determined distance (D), and a nut configured to be screwed into the protecting cover.

According to another embodiment, there is a measuring system for measuring a parameter inside of a well. The measurement system includes a tubular having a longitudinal body with two threaded ends, the body having a bore, a carrier mechanism located on an exterior of the casing, wherein the carrier mechanism has a port and a protecting cover separated from each other by a pre-determined distance (D), a gauge having at least one sensor for measuring the parameter, and a nut configured to be screwed into the protecting cover to compress the gauge toward the port.

According to still another embodiment, there is a method for attaching a gauge to a carrier mechanism, wherein the carrier mechanism is attached to a tubular. The method includes a step of inserting a nut over an electrical line which is attached to the gauge, a step of feeding the gauge through a protecting cover of the carrier mechanism, wherein the protecting cover is cylindrical and attached to the casing, a step of screwing the nut into the protecting cover to sandwich the gauge between a port of the carrier mechanism and the nut, and a step of tightening the nut so that a metal-to-metal line seal is achieved by a first face of the gauge and a port face of the port so that the gauge is fixed at both ends relative to the casing.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. In various embodiments as illustrated in the figures, a downhole gauge and a carrier mechanism are discussed. However, the novel concepts are not limited to a downhole gauge, but they may apply to any device that needs to be attached in a secure manner to a casing, pipe, tubing, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a downhole gauge is configured to be externally attached to a casing (or tube) and then lowered inside a well. For performing a function associated with the gauge, for example, measuring a vibration, the downhole gauge needs a good coupling with the casing. A carrier mechanism is used to attach the downhole gauge to the casing. The carrier mechanism has a port and protecting cover, both of them attached to the casing. The first end of the gauge connects to the port and a second end is fixed to the protecting cover with a nut.

Figure 3:
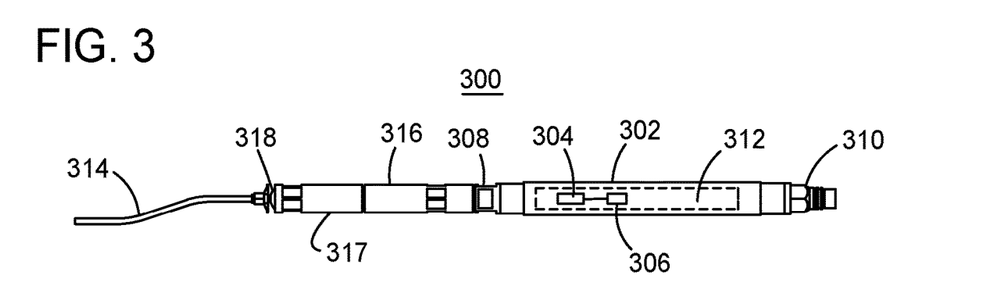
FIGS. 3 and 4 illustrate a gauge having an electrical cable that is fed through a nut.

As discussed now with regard to FIG. 3, a downhole gauge 300 includes a body 302 that may have a cylindrical shape. Body 302 may accommodate a sensor 304 (e.g., temperature sensor, pressure sensor, etc.), a control device 306 (e.g., a microprocessor or other circuitry), and other components (e.g., a battery) that are known in the art and omitted herein for brevity. Gauge 300 has two heads 308 and 310. Head 308 connects to TEC line 314 with an appropriate connector. In one embodiment, TEC line 314 has rotational constraint when mated with the gauge. Heads 308 and 310 protect the gauge from exposure to well fluids. In other words, body 302 together with heads 308 and 310 seal an interior chamber 312 of the gauge so that electronics and other components located inside interior chamber 312 are not exposed to well fluids. Primary cablehead 316 is attached to head 308 and houses the electrical connection between TEC line 314 and head 308. A secondary cablehead 317 provides tension relief to the TEC line via two swage fittings in tandem. TEC line 314 is shown in FIG. 3 exiting secondary cablehead 317. TEC line 314 may include at least one electrical cable for transmitting data between a controller (not shown) at the surface and the interior sensor and/or controller of the gauge. Secondary cable head 317 has an external face 318 that is shaped as a part of a sphere, cone or the like for purposes that will be discussed later.

Figure 4:
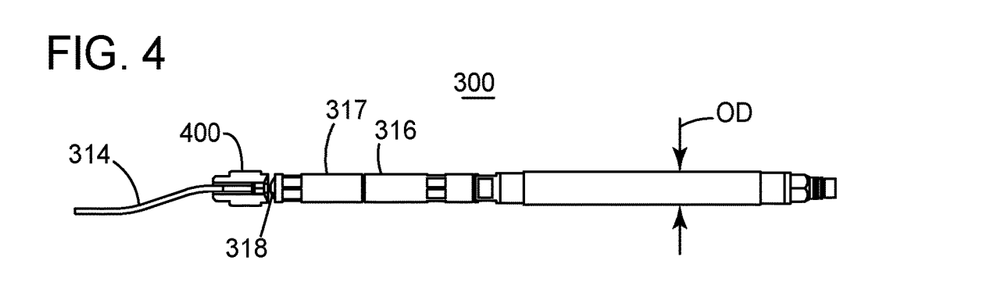

The other head 310 may include a conduit (not shown) for receiving a fluid from an inside of the casing. The fluid may be transported through an appropriate pipe to sensor 304 for performing a measurement, e.g., pressure measurement. Head 310 may also include one or more O-rings, to be discussed later, for ensuring a good seal with the carrier mechanism. FIG. 4 shows the same gauge 300 as in FIG. 3, but now having a nut 400. Nut 400 is fed over TEC line 314 when the gauge is attached to the carrier mechanism. FIG. 4 also shows an outside diameter OD of gauge 300. In one embodiment, nut 400 can have a slot in its wall, along its longitudinal axis, to ease installation of the TEC line. In another embodiment, the slotted nut could be self-locking.

Figure 5A:
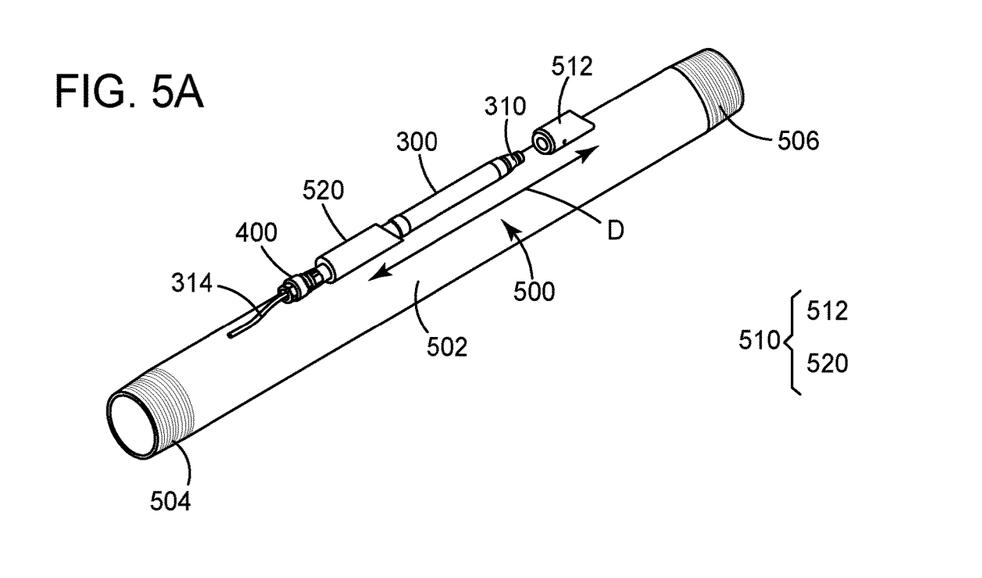
FIG. 5A illustrates a casing, a carrier mechanism attached to the casing, and a gauge.
Figure 5B:
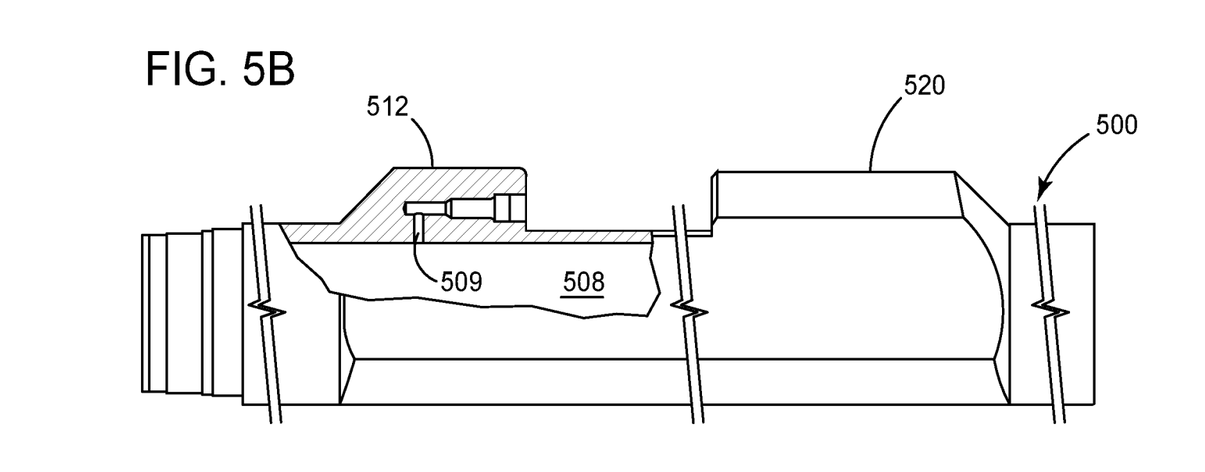
FIGS. 5B and 5C illustrate a casing and carrier mechanism integrally formed from a single piece of material.
Figure 5C:
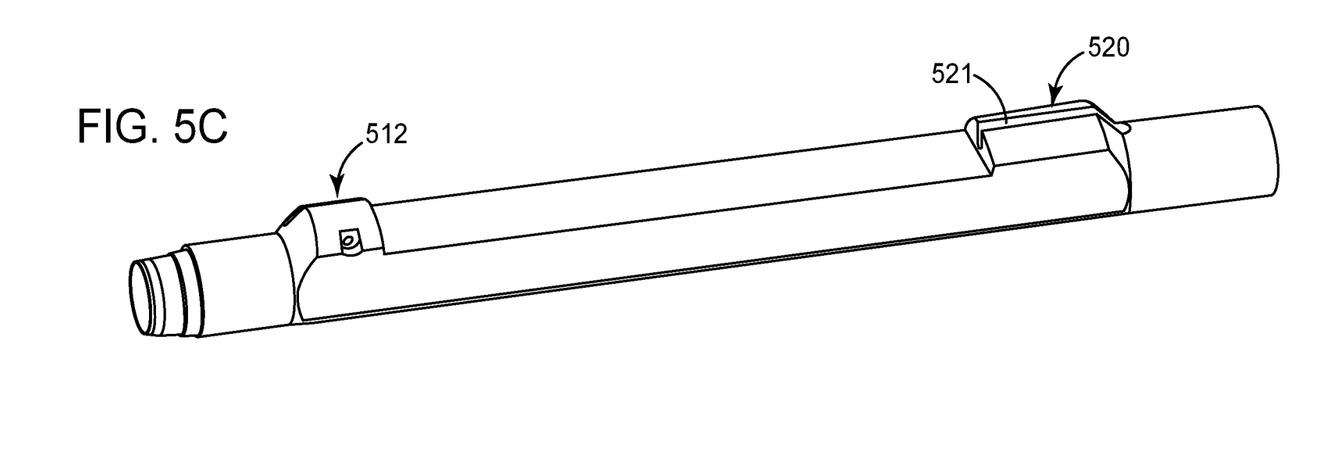

FIG. 5A illustrates one casing 500 (also called tubular) having a first end 504 and a second end 506. Casing 500 has a body 502 to which a carrier mechanism 510 is attached to. Carrier mechanism 510 is shown including two parts, a port 512 and a protecting cover 520. Port 512 is separated from protecting cover 520 by a pre-determined distance D. In one embodiment, pre-determined distance D is substantially equal to a length of gauge 300. Port 512 is attached to casing 500 in any known way, for example, welding. In another embodiment, the carrier mechanism 510 is machined as part of the casing. In other words, from a raw piece of metal, the body 502 and the carrier mechanism 510 are manufactured as a single piece as illustrated in FIG. 5B. FIG. 5C shows an overall view of the casing and carrier mechanism when formed as a single piece. For this embodiment, protecting cover 520 can be made to have a slot 521 (see FIG. 5C) for receiving one end of the gauge without sliding it, contrary to the embodiment illustrated in FIG. 5A. FIG. 5B shows port 512 having an internal conduit 509 that fluidly connects gauge 300 (not shown in FIG. 5B) and bore 508.

Figure 6:
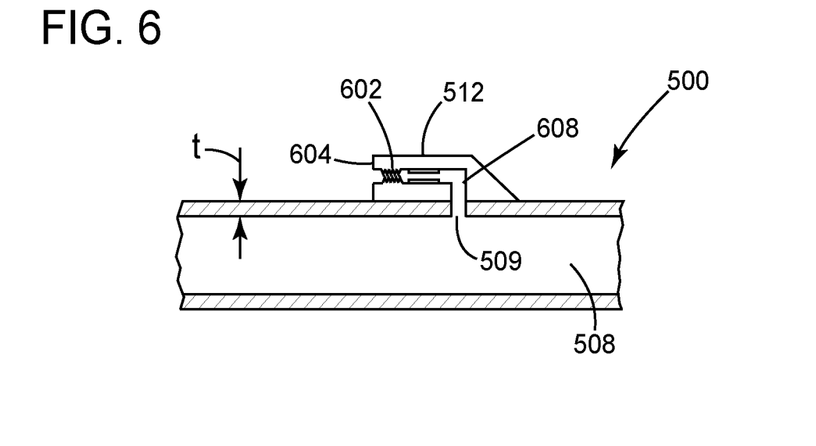
FIG. 6 illustrates a port of a carrier mechanism.

Port 512 of the embodiment shown in FIG. 5A may fluidly communicate with bore 508 as illustrated in FIG. 6. Port 512 may optionally include an inside threaded region 602. Port 512 also includes a metal face 604 (e.g., a shoulder) that connects to a corresponding metal face on gauge 300 as discussed later. A conduit 608 formed inside port 512 may fluidly connect gauge 300 to bore 608 through a hole 509 formed in a wall of casing 500. However, both conduit 608 in port 512 and hole 509 in casing 500 are optional and gauge 300 can function without the conduit 608 and hole 509, i.e., gauge 300 may measure pressure and/or temperature or other parameters outside the casing. FIG. 6 also shows a thickness t of casing 500's wall. If the casing and carrier mechanism illustrated in FIG. 5B are used, hole 509 and conduit 608 are just a hole.

Figure 5D:
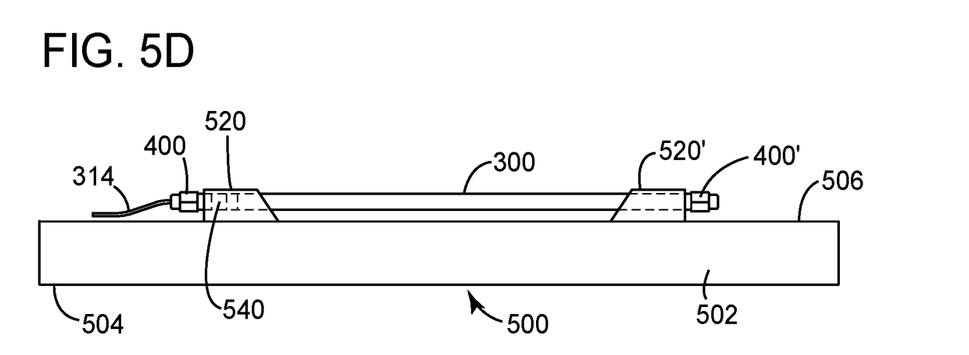
FIG. 5D illustrates a carrier mechanism having two protective covers and no ports.

FIG. 5D illustrates another embodiment in which two protecting covers 520 and 520' are used for fixing gauge 300 to casing 500. Note that port 512 is missing in this embodiment. Each protecting cover 520 and 520' has its own nut 400 and 400', respectively. In this way, a variety of gauge lengths may be accommodated because of the nuts 400 and 400'. This functionality may be further enhanced if one or more spacers 540 are added between an end of the nut and an end of the gauge.

Figure 7:
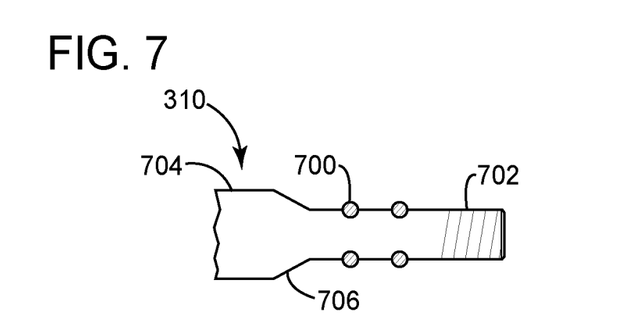
FIG. 7 illustrates a first end of a gauge.

Gauge 300's end 310 is illustrated in FIG. 7 and shows at least one O-ring 700, an optional threaded region 702, which threads into the corresponding threaded region 602 inside port 512, and a metal face 706. Note that O-ring 700 may be located between threaded region 702 and metal face 706 or the metal face 706 may be located between O-ring 700 and threaded region 702. When gauge 300 is pushed in place inside port 512, port metal face 604 contacts gauge metal face 706 along a line, so that a metal-to-metal line seal is achieved. Note that threaded regions 602 and 702 are optional. If these threaded regions are not present, than the metal seal between faces 706 and 604 is better than for the conventional devices because no rotation is involved between the two faces. In this respect, it is possible that rotation between metal faces produces damages, which weakens the seal. The metal-to-metal line seal is enhanced by the presence of the at least one O-ring 700, which abuts against the inside of port 512.

Figure 8:
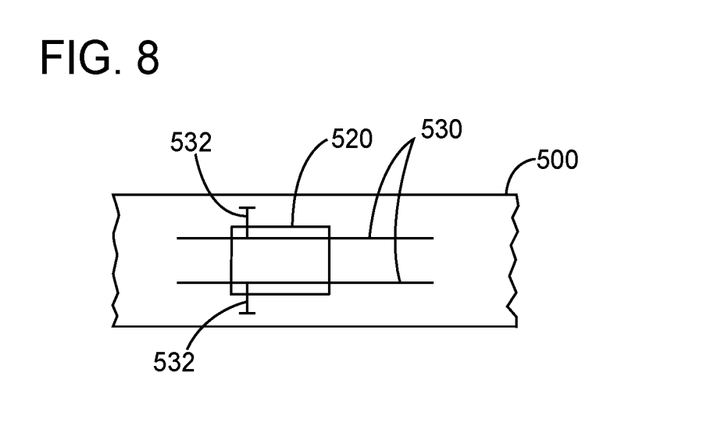
FIG. 8 illustrates a protecting cover of a carrier mechanism.

Returning to protecting cover 520 shown in FIG. 5A, it may offer multiple advantages, e.g., protects gauge 300 from damaging forces that may be exerted while in the well, and/or holds one end of the gauge in place so that it prevents violent oscillations taking place in the gauge. Protecting cover 520 may be fixedly attached to casing 500, for example, by welding, bolts, etc. In one application, protecting cover 520 may be slidably attached to casing 500, e.g., by using a pair of rails 530 and an attachment mechanism 532 as illustrated in FIG. 8. Attachment mechanism 532 may include one or more screws that may be screwed through the protecting cover 520 into rails 530 to fix the cover relative to the casing. Rails 530 or equivalent mechanism may be advantageous when different sized gauges need to be attached to the same casing at different instants. For this situation, the protecting cover can be moved along rails 530 to accommodate the different lengths of the gauges.

Figure 9:
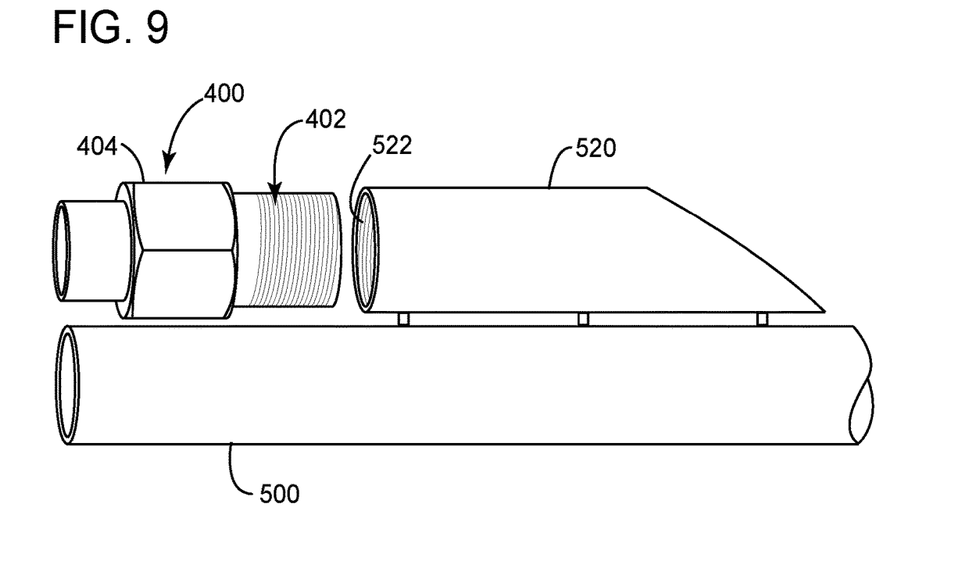
FIG. 9 illustrates how a nut is attached to a protecting cover of the carrier mechanism.

Protecting cover 520 is illustrated in FIG. 9 having an inside threaded region 522. This protecting cover threaded region 522 is designed to match an external thread 402 on nut 400 so that nut 400 can be screwed into protecting cover 520. It is also possible that region 522 is outside cover 520 and region 402 is inside nut 400. Nut 400 may have a region 404 that has a dedicated profile so that a wrench (not shown) can be attached to region 404 and used to screw in nut 400.

Thus, when gauge 300 needs to be attached to casing 500, nut 400 is placed over TEC line 314. Then, TEC line is attached to head 308 and gauge 300 is slid through the protecting cover 520. Then, gauge 300 is pushed-in into port 512. By screwing nut 400 with a pre-determined torque into protecting cover 520, metal faces 706 and 604 are pressed against each other without rotation and O-ring 700 further enhances the seal inside port 512. Rotating nut 400 into protecting cover 520 does not affect TEC line 314. TEC line 314 may be attached to the exterior of the casing all the way to the surface.

Figure 10:
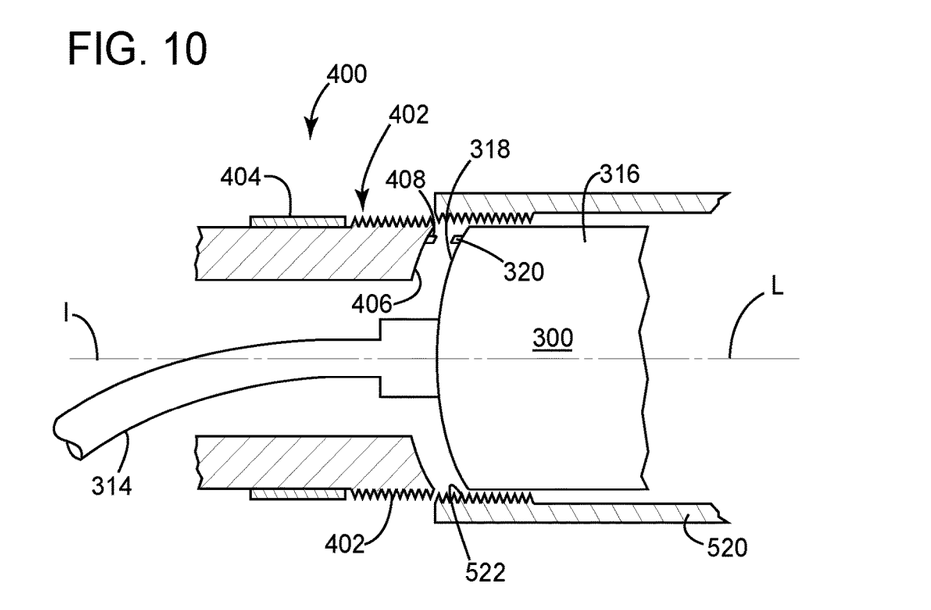
FIG. 10 illustrates how a gauge is sandwiched between a nut and a port.

The round shape of gauge 300's external face 318 is configured to mate with a curved face 406 of nut 400 so that when nut 400 is screwed into protecting cover 520, as illustrated in FIG. 10, gauge 300 is centrally seated relative to nut 400. In other words, the gauge is seated into carrier mechanism 510 by inserting first end 310 into corresponding port 512 and fixing second end 316 by pressing nut 400's curved face 406 toward second end 316's external face 318. Curved face 406 and external face 318 are manufactured to align with each other and to force a longitudinal axis L of gauge 300 to substantially coincide with a longitudinal axis I of nut 400. In one application, the two longitudinal axes L and I may be parallel to each other. One skilled in the art would note that faces 406 and 318 may have other shapes, e.g., conical, spherical, etc., for as long as their contact forces a relative alignment of one face relative to the other. Note that nut 400 may have an internal diameter corresponding to thread region 402 that is larger than the external diameter of gauge 300 so that part of first end 316 fits inside nut 400.

Figure 11:
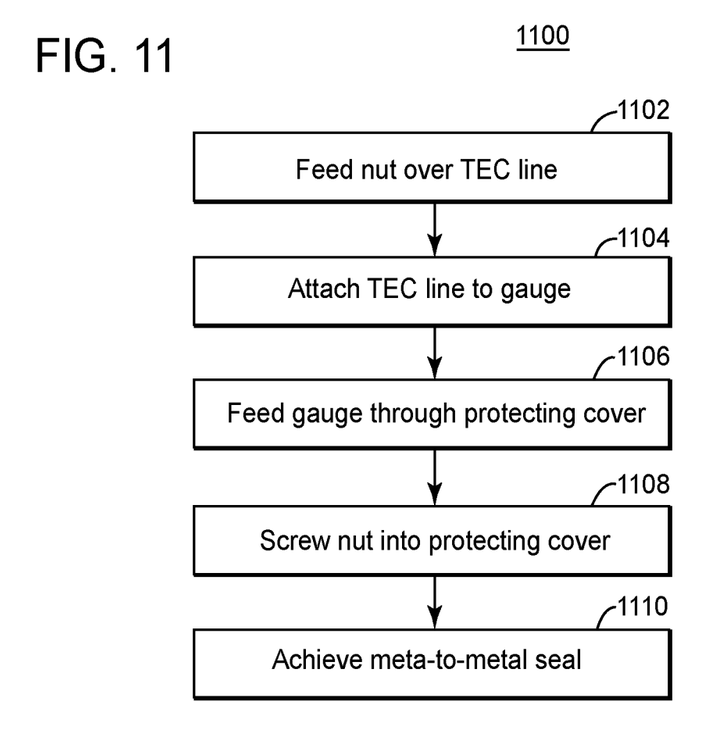
FIG. 11 is a flowchart of a method for attaching a gauge to a casing.

A method for attaching gauge 300 to casing 500 is now discussed with regard to FIG. 11. According to method 1100, nut 400 is fed onto TEC line 314 in step 1102. Then, TEC line 314 is attached to gauge 300 in step 1104. In step 1106, gauge 300's first end 310 is fed through protecting cover 520 until end 316 reaches and connects with port 512. In step 1108, nut 400 is pushed into protecting cover 520 and screwed in to fix end 318 of gauge 300 along longitudinal axis L and radially. Prior to screwing-in nut 400, it is possible to add a thread-locking adhesive to one or more of the thread regions of the nut and/or port to prevent the nut or gauge from unscrewing, which also results in preventing the external fluid entering the gauge or port. In an optional step, protecting cover may be moved along rails 530, if present, to account for the exact length of gauge 300. Also, a small change in gauge 300's length may be accommodated by the threaded region 402 of nut 400. In step 1110, the nut is tightened with a predetermined torque so that the metal-to-metal contact between faces 706 and 604 is sealed, and O-ring 700 engages an inside of the port 512, thus further enhancing the seal. In one embodiment, there is a step of forming a slot into the nut, and/or a step of machining the tubular and the carrier mechanism from a same piece of material, and/or forming a slot into the protecting cover as discussed above with regard to FIGS. 5B and 5C.

This carrier mechanism concept can be implemented over a wide variety of diameters of tubing and casing. As long as the carrier mechanism's parts are scaled to accommodate the gauge, the gauge itself can have a variety of diameters and lengths. Note that the carrier mechanism discussed above has been designed to receive the gauge so that the gauge is completely external to the casing. In one embodiment, an external diameter of gauge 300 is larger than the casing 500's wall thickness t. However, those skilled in the art would recognize that the above embodiments may be modified to form a groove in the casing's wall and to have the gauge partially located inside the groove.

Another modification to the above-discussed embodiments is to make a hole 509 into casing 500's wall to communicate with conduit 608 inside port 512 so that fluid from inside the casing is allowed to enter gauge 300 for various fluid measurements.

Yet another modification would be to use a damping material (408 and/or 320 in FIG. 10), e.g., O-Ring, elastomer, or polymer, a spring device, etc. on one or both of nut face 406 and gauge face 318, thereby acting as a lateral shock dampener.

Still another modification is to implement this style of carrier mechanism with alternate sealing methods, e.g., using a specific nose shape for the gauge's faces, or using metal, plastic and/or elastomer crush washers. Another modification may improve this design by adding a more robust method of thread locking, i.e., instead of using a chemical thread locker, a mechanical means of thread locking could be implemented for extreme vibration conditions.

One or more of the embodiments discussed above aide in reducing vibrations induced in the gauge as it is no longer cantilevered in its final position. The use of the push-in nut allows for variable length gauges to all have equal stabilization whereas existing designs have to allow for "slop" in tolerance stack outs and subsequently, most gauges fit loosely. The metal-to-metal seal may be implemented without rotating the mating faces 706 and 604 of the seal against each other. The metal seal is superior to the conventional metal seal, since the line of contact does not rotate (less galling potential). Additionally, one or more embodiments will provide protection for the gauge as the maximum running diameter of the completed assembly (i.e., casing and gauge) will be given by the protecting cover and the port of the carrier mechanism. Still another advantage of one or more embodiments is the fact that this carrier mechanism design allows for the gauge's electrical connection to be made up off the carrier mechanism, which reduces the rig down time normally associated with externally mounted gauges. In other words, it is less cumbersome to install the TEC line away from the carrier mechanism since the carrier mechanism is not in the way. Also, having the TEC line pre-installed to the gauge allows the gauge to be installed more quickly, saving significant rig costs.

Figure 12:
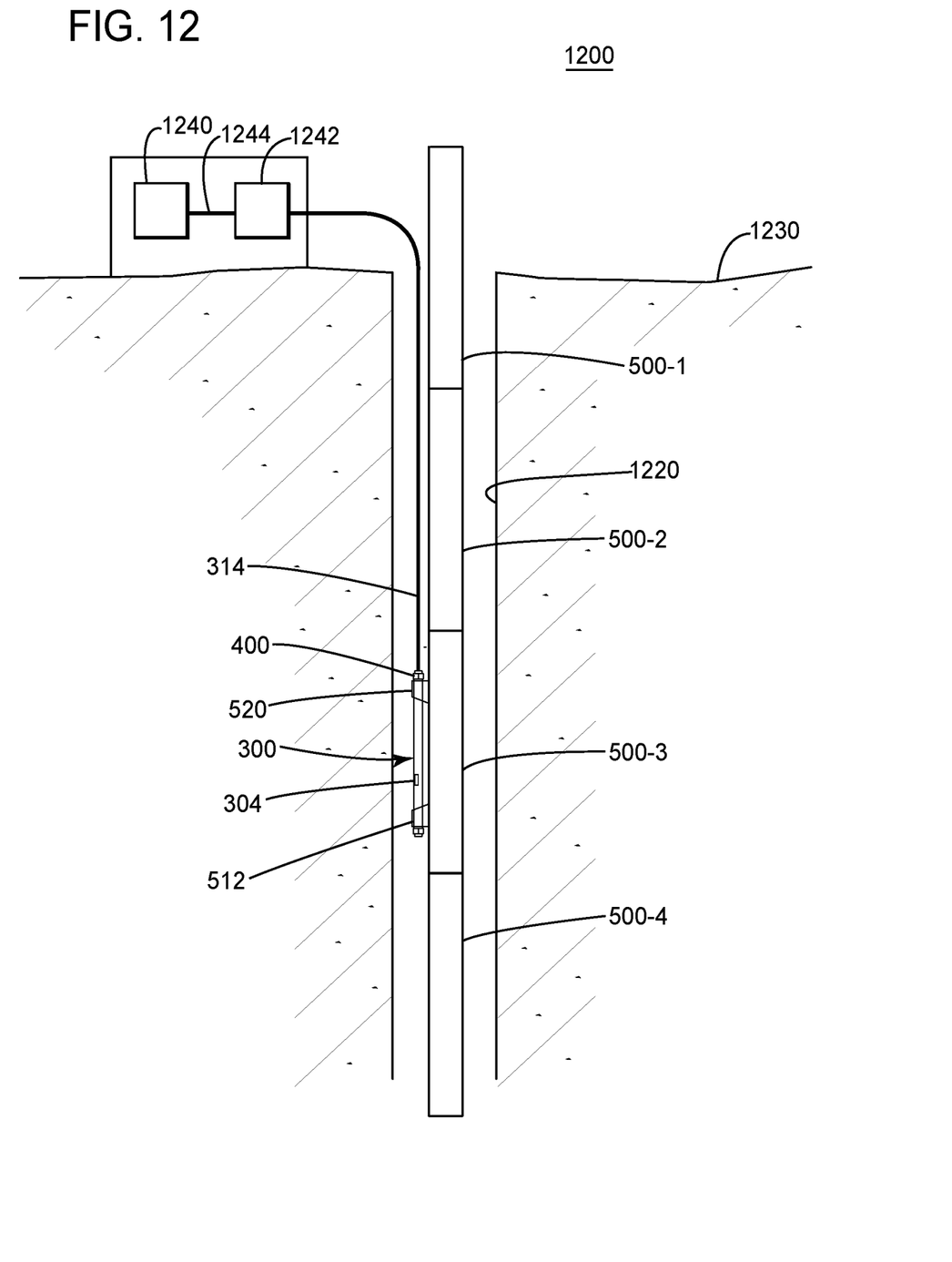
FIG. 12 illustrates a system having plural casings and a gauge attached with a carrier mechanism to one of the casings.

FIG. 12 depicts a system 1200 having plural casing tubes 500-1 to 500-4 connected to each other and deployed within a well 1220. Only four casings are shown for simplicity. Casing 500-3 is shown to have a carrier mechanism as discussed above, which includes port 512 and protecting cover 520. Gauge 300 has already been inserted through protecting cover 520 and achieved the necessary seal inside port 512, as explained above with regard to the method illustrated in FIG. 11. Note that the seal is desired only when reading a pressure inside the casing. If the gauge reads only the pressure outside the casing, no seal is necessary between the gauge and the port. Nut 400 has been screwed into protecting cover 520 and TEC line 314 is shown extending all the way to the surface 1230. After gauge 300 and corresponding casing 500-3 have been deployed to the desired depth inside the well, gauge 300 is configured to receive command signals from computer 1240 along TEC line 314. A controller 1242 may be linked through cable 1244 to computer 1240 and configured to control when sensor 304 inside gauge 300 should perform measurements. Alternatively, processor 306 (shown in FIG. 3) may be configured to directly control sensor 304's activities. Controller 1242 and processor 306 may be configured to exchange data, e.g., commands and/or measurements. In one application, any information sent by the gauge to the surface 1230 of the well may be received and stored in computer 1240 and/or controller 1242. Computer 1240 and controller 1242 may be integrated in a single unit, which may be portable (e.g., located on a truck or any other movable device). TEC line 314 may have one or more strength members in addition to data and/or power cables.

The disclosed embodiments provide an apparatus and method for easily and securely attaching a downhole gauge to a casing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A tube for use inside a well, the tube comprising:
a longitudinal body having two threaded ends, the body having a bore;
a carrier mechanism located on an exterior of the body, wherein the carrier mechanism has a port and a protecting cover separated from each other by a predetermined distance (D) so as to accommodate a gauge there-between; and
a nut configured to be screwed into the protecting cover thereby compressing the gauge toward the port, wherein the gauge has an electrical line that is fed through the nut or through a slot made in the nut.

2. The tube of claim 1, wherein the entire carrier mechanism is located outside the tube.

3. The tube of claim 1, wherein the port has a port face configured to contact a first gauge face of the gauge to achieve a metal-to-metal line seal contact.

4. The tube of claim 3, wherein the gauge has a second face that is curved and configured to mate with a curved face of the nut so that the gauge is centered relative to the protecting cover.

5. The tube of claim 4, wherein at least one of the curved face of the nut and the second face of the gauge is covered with a damping material.

6. The tube of claim 1, wherein the gauge is fed through the protecting cover prior to contacting the port when the protecting cover has no slot or the gauge is introduced through a slot formed in the protecting cover.

7. The tube of claim 6, wherein the gauge is fixed at both ends when attached to the carrier mechanism.

8. The tube of claim 1, wherein the protecting cover is cylindrical and protects the gauge attached to the port.

9. The tube of claim 1, wherein the protecting cover has an inside threaded region and the nut has an outside threaded region and the threaded regions mate with each other.

10. The tube of claim 1, wherein the carrier mechanism further comprises:
a pair of rails fixedly attached to an exterior of the tube, wherein the protecting cover is configured to be movably attached to the pair of rails to accommodate gauges having different lengths.

11. The tube of claim 1, further comprising:
the gauge configured to measure a parameter inside the well, the gauge being attached to the carrier mechanism at both ends without rotating the gauge relative to the port.

12. The tube of claim 1, wherein the port is another protecting cover having a corresponding nut.

13. A measuring system for measuring a parameter inside of a well, the measurement system comprising:
a tubular having a longitudinal body with two threaded ends, the body having a bore;
a carrier mechanism located on an exterior of the body, wherein the carrier mechanism has a port and a protecting cover separated from each other by a predetermined distance (D);
a gauge having at least one sensor for measuring the parameter; and
a nut configured to be screwed into the protecting cover to compress the gauge toward the port,
wherein the carrier mechanism further comprises:
a pair of rails fixedly attached to an exterior of the body, wherein the protecting cover is configured to be movably attached to the pair of rails to accommodate gauges having different lengths.

14. The system of claim 13, wherein the entire carrier mechanism and gauge are located outside the body.

15. The system of claim 13, wherein the port has a port face configured to contact a first gauge face of the gauge to achieve a metal-to-metal line seal, and the gauge has a second face that is curved and configured to mate with a curved face of the nut so that the gauge is centered relative to the protecting cover.

16. The system of claim 15, wherein at least one of the curved face of the nut and the second face of the gauge is covered with a damping material.

17. The system of claim 13, wherein the gauge is fixed at both ends when attached to the carrier mechanism.

18. The system of claim 13, wherein the gauge has an electrical line that is fed through the nut or through a slot made in the nut.

19. A method for attaching a gauge to a carrier mechanism, wherein the carrier mechanism is attached to a tubular, the method comprising:

inserting a nut over an electrical line which is attached to the gauge and cannot rotate;

feeding the gauge through a protecting cover of the carrier mechanism, wherein the protecting cover is cylindrical and attached to the tubular;

screwing the nut into the protecting cover to sandwich the gauge between a port of the carrier mechanism and the nut; and tightening the nut so that a metal-to-metal line seal is achieved by a first face of the gauge and a port face of the port so that the gauge is fixed at both ends relative to the tubular.

20. The method of claim 19, further comprising:
forming a slot into the nut.

21. The method of claim 19, further comprising:
machining the tubular and the carrier mechanism from a same piece of material.

22. The method of claim 19, further comprising:
forming a slot into the protecting cover.

* * * * *